United States Patent [19]

Jaala

[11] Patent Number: 5,377,722

[45] Date of Patent: Jan. 3, 1995

[54] FOLDED SPIRAL SEAM INCLUDING LONGITUDINAL BONDING STITCH

[75] Inventor: Erkki Jaala, Tampere, Finland

[73] Assignee: Tamfelt Oy Ab, Tampere, Finland

[21] Appl. No.: 7,883

[22] Filed: Jan. 22, 1993

[30] Foreign Application Priority Data

Feb. 24, 1992 [FI] Finland .................... 920810

[51] Int. Cl.$^6$ .................... D03D 13/00; D21F 7/10; F16G 3/02

[52] U.S. Cl. .................... 139/383 AA; 162/904; 245/10; 24/33 K; 28/141; 112/423

[58] Field of Search ............ 112/262.1, 265.1, 267.1, 112/415, 423, 425, 434; 162/273, 374, 901, 904; 139/383 A, 383 AA, 425 A; 245/10, 11; 24/33 A, 33 C, 33 K; 28/141

[56] References Cited

U.S. PATENT DOCUMENTS

| | | | |
|---|---|---|---|
| 3,900,659 | 8/1975 | MacBean | 162/904 X |
| 4,103,717 | 8/1978 | Clark | 162/904 X |
| 4,244,084 | 1/1981 | Gisbourne | 162/904 X |
| 4,469,142 | 9/1984 | Harwood | 162/904 X |
| 4,476,902 | 10/1984 | Westhead | 162/904 X |
| 4,979,543 | 12/1990 | Moriarty et al. | 162/904 X |

FOREIGN PATENT DOCUMENTS

| | | | |
|---|---|---|---|
| 1251105 | 9/1967 | Germany | 162/904 |
| 0196087 | 5/1985 | Sweden | 162/904 |

*Primary Examiner*—Clifford D. Crowder
*Assistant Examiner*—Ismael Izaguirre
*Attorney, Agent, or Firm*—Lowe, Price, Leblanc & Becker

[57] ABSTRACT

A seam structure for a drying wire, produced by reducing the thickness of the end portion of the drying wire and folding the end portion double and stitching the double wire portion to hold it together; and a method for producing the seam structure. At least part of the stitch (6; 6a, 6b) is sewn in parallel with warp threads (2) in the direction of travel of the drying wire between the warp threads (2) so that it will be positioned below the contact surfaces of the warp threads, the stitch end close to the seam being sewn double over a distance and the stitch end remote from the seam is bonded to the wire side facing away from the web by silicone (7) or some other suitable glue-like material.

12 Claims, 2 Drawing Sheets

FOLDED SPIRAL SEAM INCLUDING LONGITUDINAL BONDING STITCH

FIELD OF THE INVENTION

The invention relates to a method for forming a seam at the ends of a wire gauze in a paper machine.

BACKGROUND OF THE INVENTION

Seams in the wires of paper machines are usually formed by reducing the thickness of the wire ends on the wear side facing away from the web, and the portion with the reduced thickness is folded double, whereafter a seam spiral is attached to the loops formed by the folded threads for interconnecting the wire ends. The folded wire end, the thickness of which is substantially equal to the original wire thickness when the thickness has been reduced appropriately, is stitched to form a substantially integral wire portion by means of thread stitches extending in the transverse direction of the wire. In prior art wire solutions, where the warp threads forming the surface extend in the direction of travel of the wire, that is, in its longitudinal direction, a problem is caused by the fact that the thread used for sewing the stitch is exposed to rubbing and wears out when the wire is used so that it gradually begins to break. As a result of this, the seam gradually begins to get weaker, and so the wire has to be replaced with a new one before the wire gauze itself needs to be replaced. This, in turn, involves extra, unnecessary costs.

SUMMARY OF THE INVENTION

An object of the present invention is to provide a method for producing a seam structure for a wire, which avoids the above-described difficulties. The method according to the invention is characterized in that at least part of the bonding stitch is sewn as stitches running in the longitudinal direction of the wire with suitable spacings in the transverse direction of the wire in warp interspaces between the warp threads so that the thread of the bonding stitch lies below the contact surfaces of the warp threads as seen from the surface of the wire.

Another object of the invention is to provide a wire gauze for a paper machine, which avoids the problems associated with the prior art solutions.

According to the present invention, the foregoing and other objects are attained by forming a seam at the ends of a wire gauze in a paper machine wherein the thickness of the ends of the wire gauze is reduced by removing gauze material from the wear surface of the wire; the end of the wire portion with the reduced thickness is folded on the wear surface of the wire so that it forms a double gauze structure within the area of the portion with the reduced thickness; warp threads at the fold form loops, to which a seam spiral is attachable; and the folded end portion is bonded to the wire gauze by sewing a bonding stitch through the doubled portion.

The invention also relates to a paper machine wire in which the thickness of the ends of the wire gauze is reduced by removing gauze material from the wear side of the wire to form a joining seam; the wire gauze end portion with the reduced thickness is folded on the wear side of the wire so that it forms a double gauze structure within the portion with the reduced thickness; warp threads at the fold form loops, to which a seam spiral is attachable; and the folded end portion of the wire gauze is bonded to the wire gauze by sewing a bonding stitch through the doubled portion.

DESCRIPTION OF THE INVENTION

The wire gauze according to the invention is characterized in that at least part of the bonding stitch is sewn as stitches running in the longitudinal direction of the wire with suitable spacings in the transverse direction of the wire in warp interspaces between the warp threads so that the thread of the bonding stitch lies below the contact surfaces of the warp threads as seen from the surface of the wire.

The basic idea of the invention is that the bonding stitches of the seam are sewn at least partially longitudinally of the wire with suitable predetermined spacings in the transverse direction of the wire so that they will be positioned in warp interspaces between adjacent warp threads, being thus positioned below the contact surfaces of the warp threads of the wire inside the wire so that they will not be in contact with any external rubbing body, such as a roll. Another advantageous basic idea of the invention is that the ends of the warp-direction stitches are bonded to the wire side facing away from the paper or fiber web by silicone or a similar material which fastens off possible thread ends and thus prevents the stitches from opening. A preferred embodiment of the invention is characterized in that the stitch is made continuous by providing a diagonal stitch between the opposite ends of two adjacent warp-direction stitches, the diagonal stitch running along warp lines between the loops of the warp threads so that it is also positioned below the contact surfaces of the warp threads. The stitch thus extends over the entire width of the wire without that the sewing thread is exposed to wear or that the sewing thread would cause wiremarks in the web.

An advantage of the seam structure according to the invention is that the stitch will always be positioned below the contact surfaces of the warp threads so that it will not wear out or cause wiremarks in the web. Furthermore, the stitch can be made with a thread of a desired thickness to provide the seam with sufficient strength. The stitch is also easy to produce.

Figure 1:
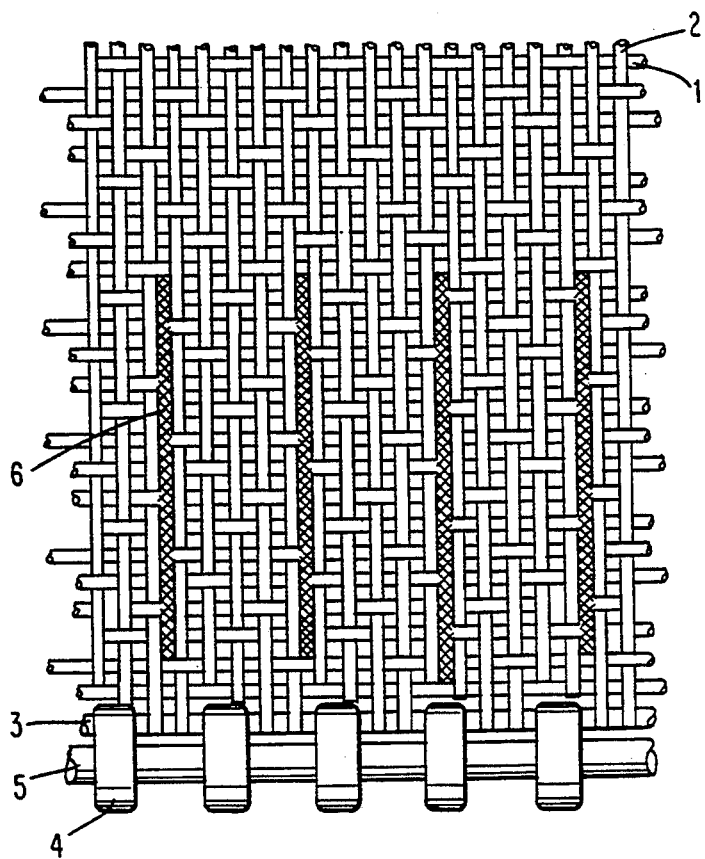
FIG. 1 is a schematic top view of a seam structure according to the invention for a wire gauze as viewed from the web side of the wire.
Figure 3:
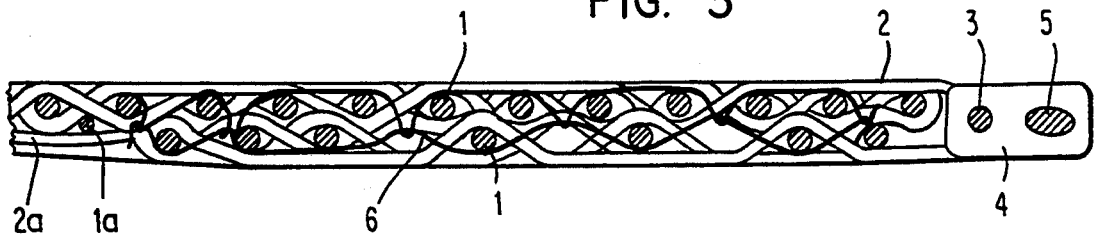
FIG. 3 illustrates schematically the seam structure according to the invention when cut open in the warp direction.

FIG. 1 shows a wire seam according to the invention as viewed from the side of the fiber web. The wire comprises transverse weft threads 1 and warp threads 2 running in the longitudinal direction of the wire, i.e. in its direction of travel. For the seam the thickness of the wire has been reduced, as illustrated in FIG. 3, and the topmost gauze layer of the wire has been folded double. Spirals or joining loops 4 are attached in a manner known per se by a joining thread 3 to loops 2a formed by the folded warp threads 2, and a locking thread 5 runs through the joining loops 4 between the ends. To hold together the folded wire end portion, a warp-direction stitch 6 runs in a warp interspace between the warp threads 2 below the warp thread surfaces in contact with the web. In the embodiment of FIG. 1, the individual bonding stitches are all parallel with the warp threads, and a to-and-fro locking stitch is provided at their ends to prevent the stitches from opening. The sewing of the stitch is preferably started from the side of the folded edge close to the spiral joint by sewing first a distance towards the edge, whereafter the sewing is continued in the opposite direction over the starting stitch away from the edge over a desired length, and then one again sews to and fro a few times at the other end to fasten off the thread at the end of the stitch.

Figure 2:
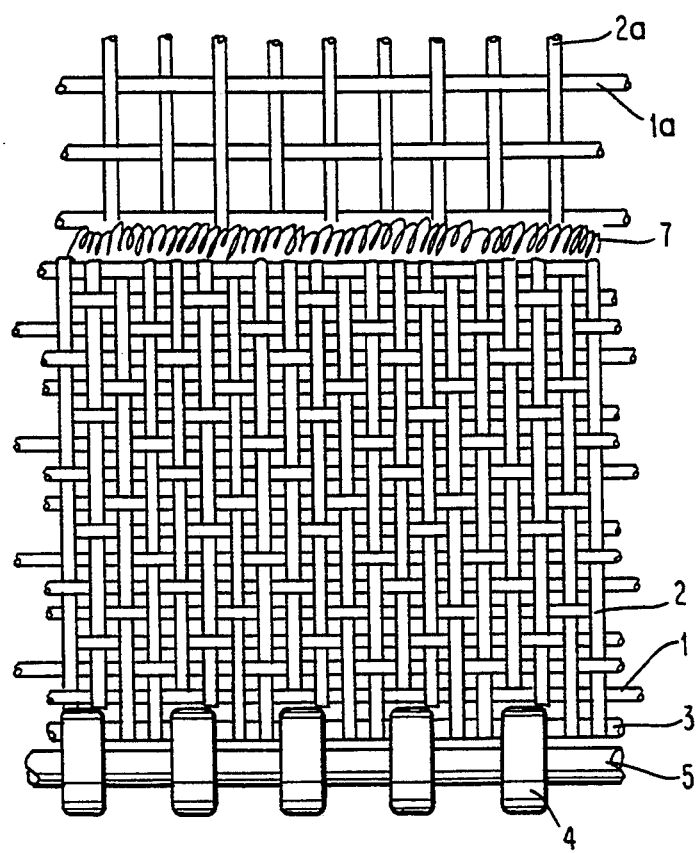
FIG. 2 illustrates the structure shown in FIG. 1 as viewed from the opposite side of the wire.

FIG. 2 shows the structure of FIG. 1 from below, that is, from the other side of the wire, and it can be seen that there is a loose base gauze formed by second weft threads 1a and second warp threads 2a on the other side of the wire and how the surface gauze of the wire is folded inward from the edge of the seam. To fasten off the ends of the threads of the stitch 6, silicone or other similar glue-like material is applied within the end area of the folded wire gauze at the juncture between the base gauze and the surface gauze. This material adheres firmly to the wire gauze while it bonds the threads at the end of the stitch 6 so that the stitch will not open when the wire is used. If the stitch has been sewn as described above, it will not either open at the end close to the spiral joint, so that the bonding with the glue-like material ensures that it will hold.

FIG. 3 illustrates schematically the wire structure shown in FIGS. 1 and 2 when cut open in the warp direction. The passage of the warp threads is not shown more closely but the figure primarily illustrates the stitch 6 of the weft threads running between the warp threads. As appears from FIG. 3, the thread forming the stitch 6 runs outside the weft threads 1, whereas it runs inside the wire with respect to the extreme points of the warp threads 2, that is, the contact points and contact surfaces; in other words, it is positioned below the surface of the wire.

Figure 4A:
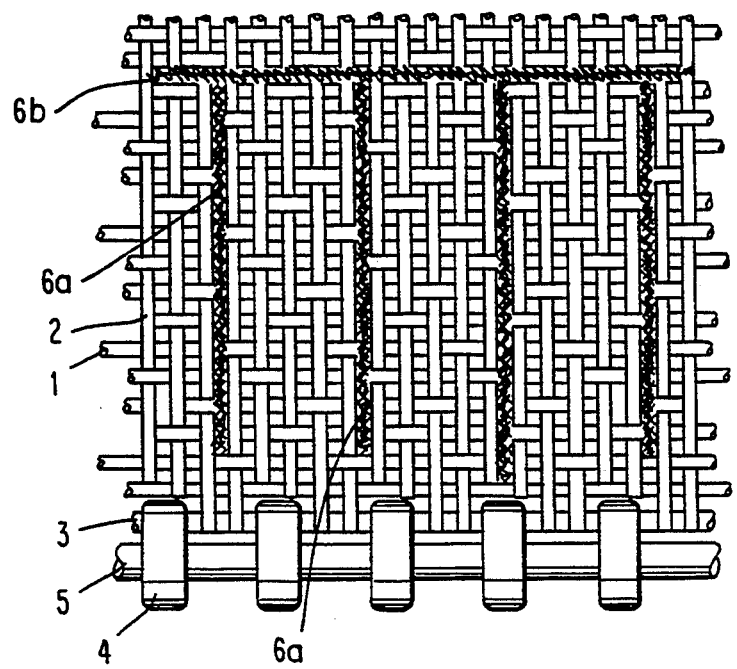
FIGS. 4a and 4b illustrate schematically a few embodiments of the stitch of the seam structure according to the invention.

FIG. 4a shows schematically one embodiment of the invention, in which the bonding stitch is continuous. A warp-direction stitch 6a is double, and the stitch continues between two adjacent warp-direction stitches as a weft-direction stitch 6b, i.e. between the stitch ends remote from the joining seam. In this case, the stitch portion 6b is, in fact, exposed to wear, but the double warp-direction stitch portion 6a is protected against wear and prevented from opening as it is bonded on the other side of the wire by silicone or a similar material.

Figure 4B:
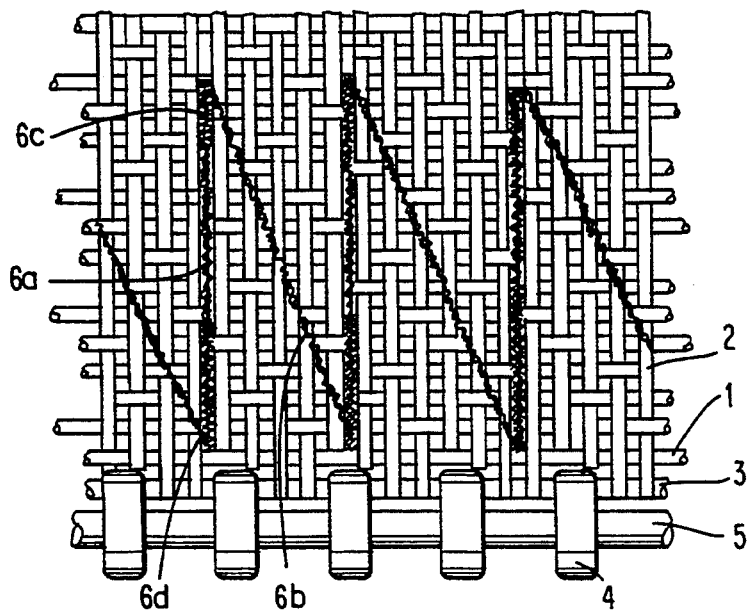

FIG. 4b shows another preferred embodiment of the invention, in which straight warp-direction stitches 6a are interconnected at their opposite ends by a diagonal stitch 6c running in a so-called warp line formed between the loops of the warp threads 2, so that the loops formed by the stitching thread will again be positioned below the contact surfaces of the warp threads, being thus protected. In this type of stitch, a to-and-fro stitch parallel to the portion 6a may be made e.g. within an area 6d to lock the end of the stitch 6a close to the seam and to increase the strength of the bond at the end remote from it. Even in this embodiment it is preferable to lock the stitch portion remote from the seam by silicone or other suitable glue-like material.

The invention has been described above and in the drawings by way of example, and it is in no way restricted to this example. Essential is that at least part of the stitch is sewn between the warp threads in parallel therewith and preferably in such a way that the end close to the seam is locked by a to-and-fro stitch, and the end remote from the seam is locked at the juncture between the surface gauze and the base gauze of the wire by a suitable elastic glue-like material, such as silicone or the like.

I claim:

1. A method for forming a seam in a wire gauze in a paper machine, wherein the wire gauze has ends, a thickness, a wear or contact surface, a longitudinal direction in the intended direction of travel, and a transverse direction, which method comprises reducing the ends of the wire gauze by removing gauze material from the wear surface of the wire; folding the ends of the wire portion with the reduced thickness on the wear surface of the wire thereby forming a double gauze structure within the area of the portion with the reduced thickness; forming loops at the fold with warp threads at the fold form loops to which a seam spiral is attachable; and bonding the folded end portion to the wire gauze by sewing a bonding stitch through the double portion; wherein at least part of the bonding stitch is sewn as stitches running in the longitudinal direction of the wire with suitable spacings in the transverse direction of the wire in warp interspaces between the warp threads so that the thread of the bonding stitch lies below the contact surfaces of the warp threads.

2. A method according to claim 1, wherein the bonding stitch is sewn as several separate stitches running in the longitudinal direction of the wire.

3. A method according to claim 2, wherein sewing of each longitudinal bonding stitch is started near the folded edge of the wire gauze and initially sewn a distance towards the folded edge of the wire gauze at the end where the bonding stitch is started; that thereafter the stitches sewn backward over the starting stitch away from the folded edge a desired distance; and that the stitch is sewn at least once backwards over a distance towards the folded edge of the wire gauze at the terminating end of the bonding stitch to fasten off the terminating end.

4. A method according to claim 1, wherein the bonding stitch is sewn as a continuous stitch so that a diagonal bonding stitch runs between the opposite ends of two adjacent bonding stitches running in the longitudinal direction of the wire, the diagonal stitch being positioned in a warp line formed between the loops of the warp threads below the contact surfaces of the warp threads.

5. A method according to claim 1, wherein the ends of the bonding stitch remotest from the folded edge of the wire are bonded by a bonding material applied within the end area of the wire gauze folded on the wear surface of the wire.

6. A method according to claim 5, wherein the bonding material is a silicone.

7. A paper machine wire comprising a wire gauze having ends, a thickness, a wear or contact surface, a longitudinal direction in the intended direction of travel and a transverse direction, wherein the thickness of the ends of the wire gauze is reduced by removing gauze material from the wear side of the wire to form a joining seam; the wire gauze end portion with the reduced thickness is folded on the wear side of the wire so that it forms a double gauze structure within the portion with the reduced thickness; and warp threads at the fold form loops, to which a seam spiral is attachable; the folded end portion of the wire gauze is bonded to the wire gauze by sewing a bonding stitch through the doubled portion; and at least part of the bonding stitch is sewn as stitches running in the longitudinal direction of the wire with suitable spacings in the transverse direction of the wire in warp interspaces between the warp threads so that the thread of the bonding stitch lies below the contact surfaces of the warp threads as seen from the surface of the wire.

8. A paper machine wire according to claim 7, wherein the bonding stitch is sewn as several separate stitches running in the longitudinal direction of the wire.

9. A paper machine wire according to claim 8, wherein each longitudinal bonding stitch starts near the folded edge of the wire gauze and is sewn a distance towards the folded edge of the wire gauze from its starting point; and the bonding stitch is sewn backward over the starting stitch away from the folded edge a desired distance; and that the bonding stitch is at the terminating end at least once backward over a distance towards the folded edge of the wire gauze to fasten off the terminating end.

10. A paper machine wire according to claim 7, wherein the bonding stitch is sewn as a continuous stitch so that a diagonal bonding stitch runs between the opposite ends of two adjacent bonding stitches running in the longitudinal direction of the wire, the diagonal stitch being positioned in a warp line formed between the loops of the warp threads below the contact surfaces of the warp threads.

11. A paper machine wire according to claim 7, wherein the end portions of the bonding stitch remotest from the folded edge of the wire are bonded by a bonding material applied within the end area of the wire gauze folded on the wear surface of the wire.

12. A paper machine wire according to claim 11, wherein the bonding material is a silicone.

* * * * *